United States Patent [19]
Caron

[11] Patent Number: 4,550,399
[45] Date of Patent: Oct. 29, 1985

[54] ODYNAMICAL OPERATING RATE ALLOCATION PROCESS IN A MULTIPLEX COMMUNICATION SYSTEM

[75] Inventor: Francois G. Caron, Cagnes/Mer, France

[73] Assignee: International Business Machines Corp., Armonk, N.Y.

[21] Appl. No.: 560,637

[22] Filed: Dec. 12, 1983

[30] Foreign Application Priority Data

Dec. 28, 1982 [EP] European Pat. Off. ........ 82430049.5

[51] Int. Cl.$^4$ .......................... H04J 6/02; H04J 3/16; H04J 15/00
[52] U.S. Cl. ....................... 370/80; 370/84; 370/118
[58] Field of Search ...................... 370/84, 79, 118, 80

[56] References Cited

U.S. PATENT DOCUMENTS

| | | | |
|---|---|---|---|
| 3,711,650 | 1/1973 | Kuhn et al. | 370/84 |
| 3,794,768 | 2/1974 | Carney et al. | 370/84 |
| 4,320,520 | 3/1982 | Graham et al. | 370/84 |
| 4,471,480 | 9/1984 | Haussmann et al. | 370/84 |

Primary Examiner—Douglas W. Olms
Assistant Examiner—Wellington Chin
Attorney, Agent, or Firm—John B. Frisone

[57] ABSTRACT

This invention relates to a process for automatically allocating appropriate communication rates to different data communication lines connected to a common multiplex channel, in terms of the traffic on these lines and the available maximum rate S on this channel, so as to improve the data throughput on the common channel. To this end, Traffic $T_i^n$ is, first, valuated on each line at time $t_n$, according to formula: $T_i^n = \beta F_i^n + (1-\beta)T_i^{n-1}$

In this formula:
 $T_i^{n-1}$ is the traffic valuation at time $t_{n-1}$,
 $\beta$ is a coefficient within 0 and 1,
 $F_i^n$ is given by formula:

$$F_i^n = b_i^n[\alpha + (1-\alpha)V_M/V_i]$$

wherein
 $b_i^n$ is the number of the bits "0" transferred on to the considered line between times $t_{n-1}$ and $t_n$,
 $\alpha$ is a coefficient within 0 and 1,
 $V_M$ is the highest operating rate on the line, and
 $V_i$ is the actual rate on the considered line.

Once the traffic $T_i^n$ has been valuated for each line, each of the values $T_i^n$ is associated with available rates so that the discrepancies between these traffic valuations and the rates associated therewith, are minimum, and the so-determined sum of the rates, is equal to S.

5 Claims, 9 Drawing Figures

ODYNAMICAL OPERATING RATE ALLOCATION PROCESS IN A MULTIPLEX COMMUNICATION SYSTEM

This invention relates to communication systems wherein terminals, or lines, in a first terminal set can be connected to terminals, or lines, in a second terminal set, through a multiplex common communication channel. More particularly, it relates to systems of such a type wherein these terminals or lines can operate at different operating rates and wherein means are provided for selecting these different operating rates, taking both the features proper to these terminals, or lines, and the maximum operating rate admissible in the common communication channel, into account.

In the well-known prior art systems, such a selection has been made manually, i.e., at one end, at least, of the multiplex channel, an operator had to select manually the distribution of the required rates, which was transmitted automatically on to the other end of the channel. Such a distribution, however, remained fixed until the next following manual breaking-in. In such an arrangement, the main drawback is that the operator has to break-in many times, or else, the throughput is rather low as the multiplex channel, most of the time, is not utilized to the best of its abilities.

Therefore, the object of this invention is, in the above-mentioned conventional type communication system, to provide for a process for automatically and dynamically allocating operation rates to each of the common channel interfaces in the terms of the traffic and of the characteristics of the terminals, or lines connected thereto, so as to optimize the bulk of the information conveyed per time unit through the common channel. Such an optimization, in some cases, can improve the communication channel throughput by a factor of two. According to one aspect of this invention, the data traffic is first periodically valuated on each of the free operating rate interfaces.

Such a valuation is carried out from the following formula:

$$T_i^n = \beta F_i^n + (1-\beta) T_i^{n-1}$$

wherein:

$T^n_i$, is the traffic valuation between times $t_{n-1}$ and $t_n$, $\beta$ is a coefficient within 0 and 1, $T^{n-1}_i$, is the traffic valuation between times $t_{n-2}$ and $t_{n-1}$, $F^n_i$, is given by formula:

$$F_i^n = b_i^n \{a + (1-a)V_M/V_i\}$$

$b^n_i$, is the number of bits "0" conveyed by the considered interface i between times $t_{n-1}$ and $t_n$, $a$, is a coefficient within 0 and 1, $V_M$, is the rate of that interface which operates at the highest rate $V_i$, is the current rate of the considered interface i.

Once the traffic has been valuated for each of the free operating rate interfaces, a hierarchy of the traffic valuations $T^n_i \ldots T^n_h$ as well as a hierarchy of the free operating rates, are determined. Then, a relationship is made between the different valuated traffics and the different free operating rates, and, then, the operating rates are allocated so that, for each interface, the discrepancy between the valuated traffic and the allocated rate, is minimum, and the sum of the allocated operating rates is always equal to the sum of the initial free operating rates. A preferred embodiment of this invention will be further disclosed, with reference to the accompanying drawings, in which:

FIG. 1 illustrates, in a schematic form, a communication system which this invention can apply to.

Figure 1:
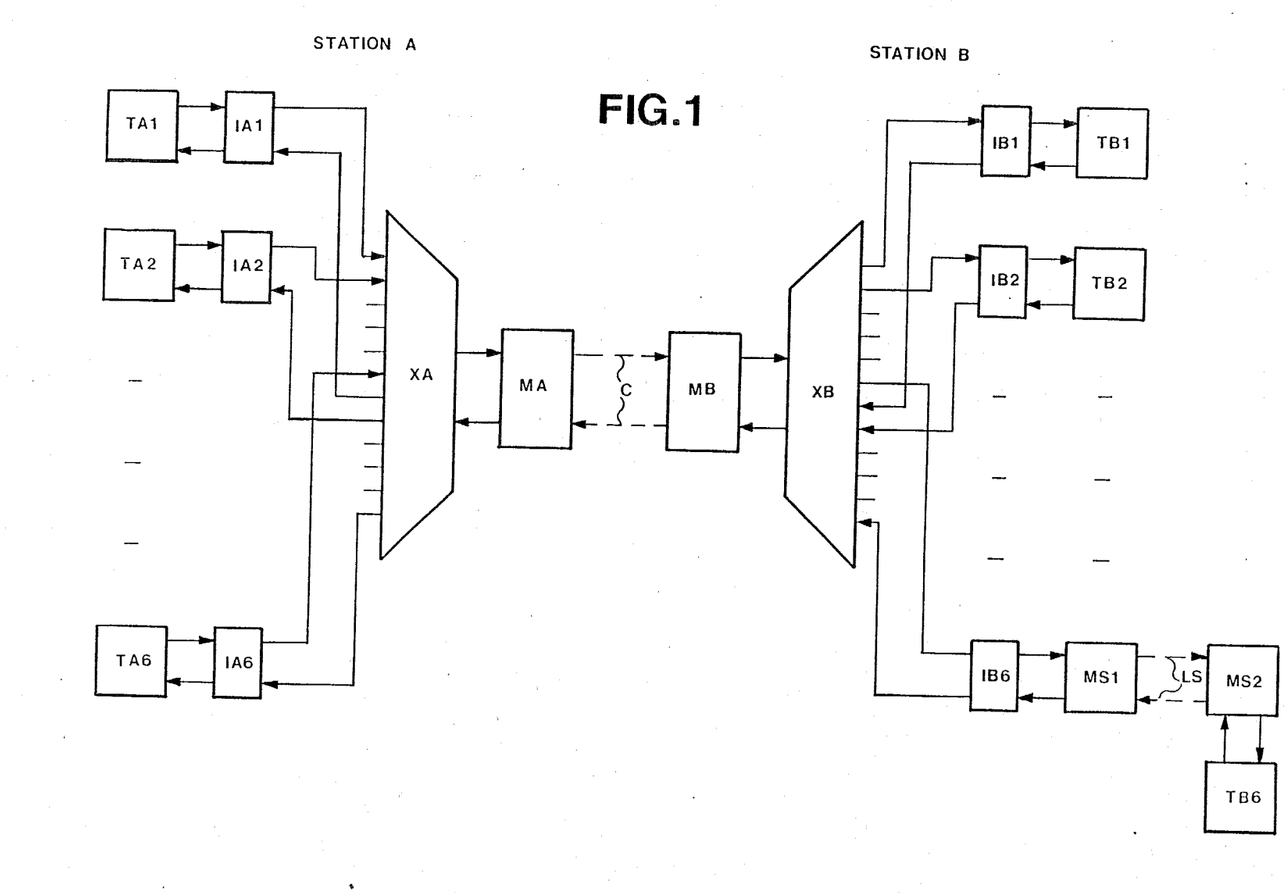

FIG. 1 illustrates, in a schematic form, a communication system which this invention can apply to.

The communication network of FIG. 1 is comprised of two remote stations A and B connected together through a common communication channel C. Terminals TA1, TA2, ..., TA6 of station A are connected to common channel C through the interfaces IA1, IA2, ..., IA6 of a multiplexer/demultiplexer XA and a modem MA. Likewise, terminals TB1, TB2, ..., TB6 of station B are connected to common communication channel C, through the interfaces IB1, IB2, ..., IB6, of a multiplexer/demultiplexer XB and a modem MB. Terminal TB6 is not directly connected to multiplexer/demultiplexer XB, contrary to terminals TB1 and TB2; but, instead, it is connected through two modems MS1 and MS2 and a secondary communication line LS, to the assembly comprising a secondary network.

It should be noted that all the illustrated communication lines are one-way and that the two-way operating rates can be different, for a same interface.

In addition, it is obvious that the system has been limited to six interfaces for a better understanding, but the maximum number of the admissible interfaces can be different and will, more particularly, vary with the maximum operating rate of the common channel C and the minimum operating rate of the terminals. By way of an example, a system wherein the common channel can be 14400 bit per second (BPS)-operated, and wherein the operating rates of the terminals is not under 2400 BPS and can be varied by 2400 BPS increments, will accept, at most, six interfaces.

Figure 2:
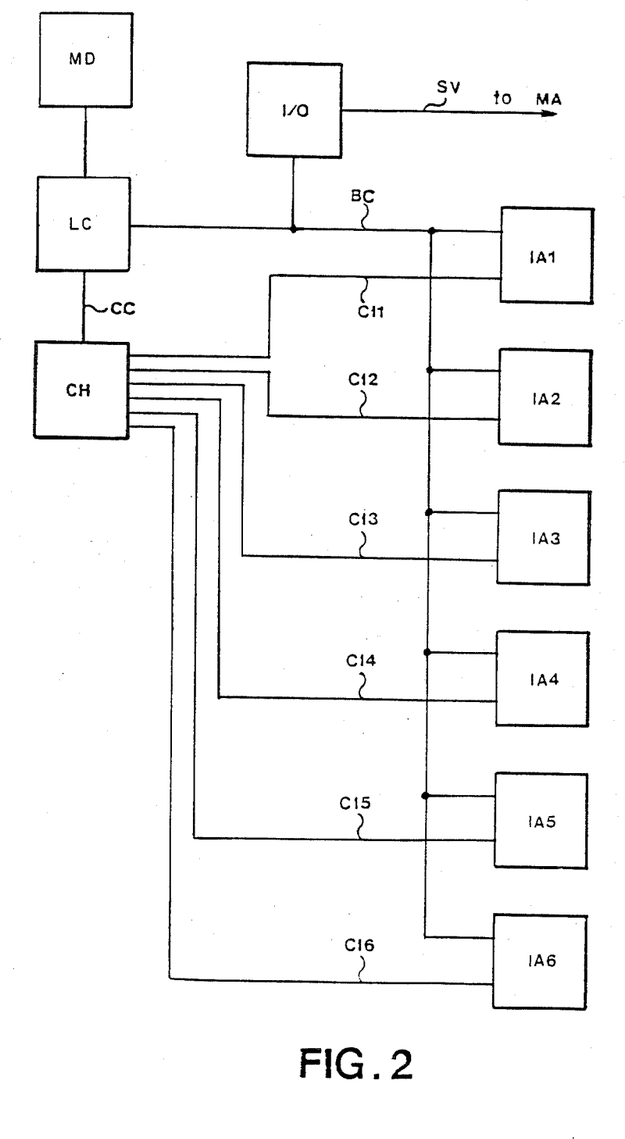
FIG. 2 is a schematic block diagram of the control circuits of the communication system shown in FIG. 1.

FIG. 2 illustrates, in a schematic form, a general arrangement of the control circuits for controlling the system for one terminal, say, terminal A.

The terminal operates under the control of logic control LC which can be a microprocessor, a data memory MD and a timing control module CH, for instance.

Control logic LC is connected to various interfaces IA1, IA2, ..., IA6 through a control bus BC, in order to proceed to all the control tests necessary for data communication. It also controls both sending and receiving the supervisory messages exchanged by the two stations, through the input/output (I/O) unit which is connected to modem MA (not shown, see FIG. 1), through line SV. Besides the particular operations relative to this invention and which will be disclosed in more details further on, logic LC proceeds to all the control and supervisory operations necessary for the operation of a communication system of the type shown in FIG. 1, and that are well-known in the art.

Data memory MD is used in a conventional way, i.e., it stores permanently or temporarily all the data that are necessary to be processed by the system logic LC.

Finally, the timing control module CH distributes the timing pulses to the various units of the system, namely, to logic LC, through line CL, and to the various interfaces IA1, IA2, . . . , IA6, through lines CI1, CI2 . . . , CI6.

The various units shown in FIG. 2 and briefly evoked, are all well-known in the art and, therefore, will not be disclosed further on.

In order to make the understanding easier, the following statements will be made (which correspond, all, to conventional cases or to conditions easy to be met):

The active lines having at one of their ends a modem connected to a secondary network, are considered to operate imperatively at the rate of the secondary network;

The terminals connected to the other lines can operate up to the maximum rate of the common communication channel (In the opposite case, provision can be made so that these terminals are systematically indicative of the tolerated maximum rate, through their interfaces);

The two communication channels corresponding to the two communication ways, respectively, are totally independent of each other, the allocation and optimization rate procedure, however, being the same; this means, more particularly, that the communication rate over one given channel will not necessarily be the same, both ways:

The modems connected to the secondary network are adapted to change automatically their rates, and it is the secondary modem that is connected to the multiplexer interface which conforms to the rate control of that modem connected to the common channel, and which controls automatically the rates of the other modems connected to the secondary network (modems of the IBM 386X series meet this requirement).

According to this invention, for a given condition according to which a plurality of lines are active at both ends of the common communication channel, the highest communication rate is allocated to that line (one way) which has, on an average, the highest data traffic.

By way of an example, when common channel C is 9600 bit per second-operated (BPS-operated), when the secondary line LS together with modems MS1 and MS2 are permanently 2400 BPS-operated, when the system rate range varies from 2400 to 9600 BPS by 2400 BPS increments and when there are two active free rate interfaces IA1 and IA2, two available rates will remain in each communication way, namely 4800 and 2400 BPS.

When the arrangement is such that the traffic of the data to be conveyed from A to B is higher on IA1 than on IB1 and that the traffic of the data to be conveyed from B to A is higher on IB2 than on IA2, the rates will be allocated as follows.

IA1 to IB1: 4800 BPS
IA2 to IB2: 2400 BPS
IA6 to IB6: 2400 BPS (fixed)
IB1 to IA1: 2400 BPS
IB2 to IA2: 4800 BPS
IB6 to IA6: 2400 BPS (fixed)

Since the traffic of the data to be conveyed over the various lines can vary along with the time, in this invention, provision is made for allocating the data rate, in an automatic and dynamic way. To this end, each transmitter is comprised of means for testing the various "free" rate interfaces (contrary to those interfaces wherein the rates are prescribed, such as, for instance, those connected to secondary networks) which are connected thereto, calculating values representative of the traffics on these interfaces, and determining a hierarchy from these values. Then, each transmitter will allocate the communication rates to terminals connected thereto in terms of these values and hierarchy, communicate this rate distribution to the receiver at the other end of the common multiplex channel C and, finally, proceed to the transfer of these data, according to said rate distribution.

Computing such values requires, first both sampling and measurement of elements directly connected to the presence of significant information on the considered lines, such as, for instance, bits "1", or bits "0", or transitions thereof. In each of the following examples, bits "0" have been retained, because, in the present CCITT standards, an idle line must continuously be transferring bits "1", and in this particularly chosen context, bits "1" would not be representative of the line activity.

The simplest approach of determining the values representative of the data traffics would consist in making directly use of the number of the bits "0" going through a given interface per time unit. Each of these values would, therefore, be represented in the form:

$$F^n{}_i = b^n{}_i$$

where $b^n{}_i$, is the number of the bits "0" transferred through interface i between times $t_{n-1}$ and time $t_n$.

This simple formula, however, has for a drawback to generate very stable bit distributions and substantial hysteresis phenomena. Indeed, when a line is operated at a rate twice as low as another one, it will transfer a number of bits twice as low, for each time unit. However, any line has, usually, a minimum activity, of the POLL/NACK type, for instance (Conventional Question/Answer protocol) which, when operated at a high rate has the risk of causing an important activity with respect to another line having a low rate but a high traffic.

A better approach would consist in weighing the quantity of the bits "0" with the communication rate, which comes, in a certain way, to measure the time length of the data conveying activity. A value could, therefore, be used, which would be of the following type:

$$F^n{}_i = b^n{}_i \times (V_M/V_i)$$

where $V_M$, is the rate of the line operating at the highest rate
$V_i$, is the rate of the considered line The use of such a formula, this time, has for a drawback that it generates unstable situations in some cases, such as, for instance, when two lines have substantially the same traffic; in that case, this formula can be at the origin of a situation where these two lines exchange their rates, in a constant manner.

According to this invention, the most appropriate solution consists in combining the two above-mentioned approaches, linearly. More particularly, it has been shown advisable to use a value of the following type.

$$F_i^n = b_i^n[\alpha + (1-\alpha)V_M/V_i]$$

Where $\alpha$ is a number within 0 and 1 which can be chosen for each of the network or which can be optimized with respect to the features appropriate to each network.

The analysis of the values obtained for function $F^n_i$ for each interface, i.e., for each value of i, would already make it possible to proceed to an excellent rate allocation, but it is still better to take all the preceding samples, into account. Sequence $F^n_i$ can, therefore, be integrated by weighing the samples in terms of time. Value $$T_i^n = \beta F_i^n + (1-\beta)T_i^{n-1}$$

wherein $T^{n-1}_i$ is the valuation of the traffic at time $t_{n-1}$ (calculated during the preceding test), and, $\beta$, is a coefficient within 0 and 1, defining the memorization effect to the preceding samples (the system is all the more stable as $\beta$ is small), will, therefore, be taken as the final valuation of traffic $T^n_i$ at time $t_n$, for interface "i".

Figure 3:
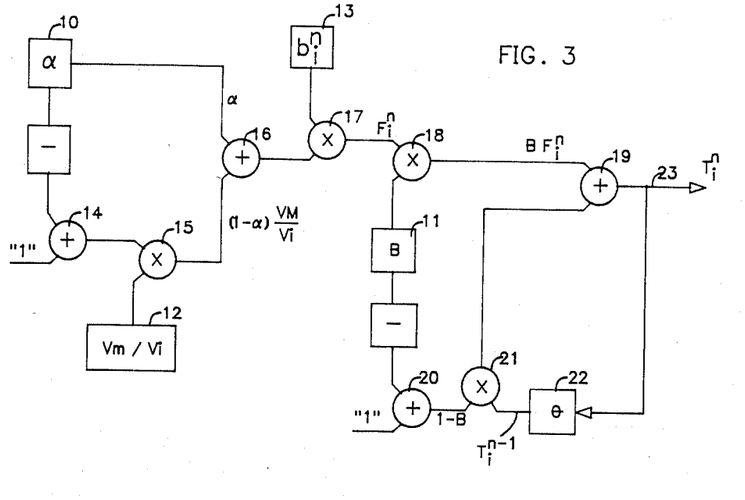
FIG. 3 illustrates in a schematic form, a logic circuit for valuating the interface data traffic, according to this invention.

FIG. 3 illustrates, in a schematic form, a logic circuit for calculating the different values of $T^n_i$.

Coefficients $\alpha$ and $\beta$ are loaded once for all into registers 10 and 11, respectively. Register 12 is loaded with ratio $V_M/V_i$, values $V_M$ and $V_i$ being read from data memory MD (which is up-dated as the rates are being allocated), and the ratio being effected by control logic LC. Finally, register 13 contains the number of the bits $b^n_i$ taken on interface "i" by logic LC, between times $t_{n-1}$ and $t_n$, and transmitted through bus BC (FIG. 2);

Adder 14, which receives $-\alpha$ and 1 on its inputs respectively sends result $(1-\alpha)$ to one input of multiplier 15 the other input of which receives $V_M/V_i$. The inputs of adder 16 receive the output signals of register 10, namely, $\alpha$, and of multiplier 15, namely, $(1-\alpha)V_M/V_i$, respectively. The output of adder 16 sends result $\alpha + (1-\alpha)V_M/V_i$ to one input of multiplier 17, the other input of which receives $b^n_i$ from register 14. Output signal $F^n_i$ of multiplier 17 is applied to one input of multiplier 18 the second input of which receives $\beta$ from register 11. The result of multiplication $\beta F^n_i$ is applied to one input of adder 19. Besides, adder 20 receives $-\beta$ and 1 on its inputs, respectively and sends the result $(1-\beta)$ to one of the inputs of multiplier 21.

The output signal of adder 19 is applied to the second input of multipier 21, through a delay circuit 22. Delay circuit 22 introduces delay $\theta = t_n - t_{n-1}$. Thus, it can be seen that output line 23 of adder 19 produces signal $T^n_i$ because its inputs receive signals $\beta F^n_i$ and $(1-\beta)T^{n-1}_i$, respectively, signal $T^{n-1}_i$ being produced at the output of delay circuit 22.

Once the different signals $T^n_i$ have been calculated, both a hierarchy for traffics $T^n_i, \ldots, T^n_h$ of the active free rate interfaces (it should be reminded, here, that the traffic is valuated for these interfaces, only) and hierarchy for the free rates, are established. As to the last mentioned hierarchy, it is, of course, established by taking the maximum rate of channel C and the rates of the fixed rate interfaces, into account. By way of an example, when the maximum rate of channel C is 14400 BPS, and when, in a six-interface system, there are, one interface operating imperatively at 2400 BPS and three interfaces at free rates, at a given time, the sum of the free rates will be 12000 BPS and the hierarchy of the free rates will be 2400, 4800, 7200, 9600 and 12000.

Then, the rates are allocated from a comparison between the different valuated traffics and the different possible rates. When keeping the same example as before (i.e. a 12000 BPS free rate sum and three active free rate-operated interfaces), an example of the rate allocation procedure will be given, in the following manner.

First, there is computed $$\frac{\Sigma_1^3 V_i}{\Sigma_1^3 T_i^n} = k$$

wherein $\Sigma_1^3 V_i$, is the sum S of the free rates (in the chosen example, S=12000), and $\Sigma_1^3 T^n_i$, is the sum of the traffic valuations made according to the above-mentioned formula, for each interface, at time $t_n$.

The purpose is to adjust, at best, the series of $T^n_i$ with the series of $V_i$ (where $V_i = 2400, 4800, 7200, 9600$ or $12000$, i.e., $2400 \, p_i$ with $p_i = 1, 2, 3, 4$ or $5$). To this end, the following steps are considered.

Step 1

For each of the three values of $kT_i$, $p_i$ is calculated so that $kT_i - 2400p_i$, is minimum. Thus, three values are found for $p_i$, namely, $p_1$, $p_2$ and $p_3$ (giving three rate values $v_i = 2400 \, p_i$, namely, $2400 \, p_1, 2400 \, p_2, 2400 \, p_3$).

Step 2

$$\text{sum } s = 2400 \, (p_1 + p_2 + p_3)$$
$$= v_1 + v_2 + v_3$$

is carried out.

Step 3 s is compared with S. The fourth step is different according as $s = S$ (step 4a), $s > S$ (step 4b) or $s < S$ (step 4c).

Step 4a (s=S)

In that case, the procedure is over, and the rates to be allocated to the considered interfaces are $V_1 = v_1$, $V_2 = v_2$, $V_3 = v_3$,

Step 4b (s>S)

In that case, interface "i" is found out for which $(2400 \, p_i - kT_i)$ is maximum, and value $p'_i = (p_i - 1)$ is taken as the new value of $p_i$ for this interface, i.e. value $2400 \, (p_i - 1)$, namely $v''_1 (v_1 - 2400)$ is taken as the new rate value. Then, step 2 is resumed, and so on, until $s = S$.

Step 4c (s<S)

In that case, interface "i" is found out for which $(kT_i - 2400 \, p_i)$ is maximum, and value $p''_i = p_i + 1$ is taken as the new value of $p_i$ for this interface, i.e., value $2400 \, (p_i + 1)$, namely $v''_i (v_i + 2400)$ is taken as the new rate value. Then, step 2 is resumed, and so on, until $s = S$.

Figure 4:
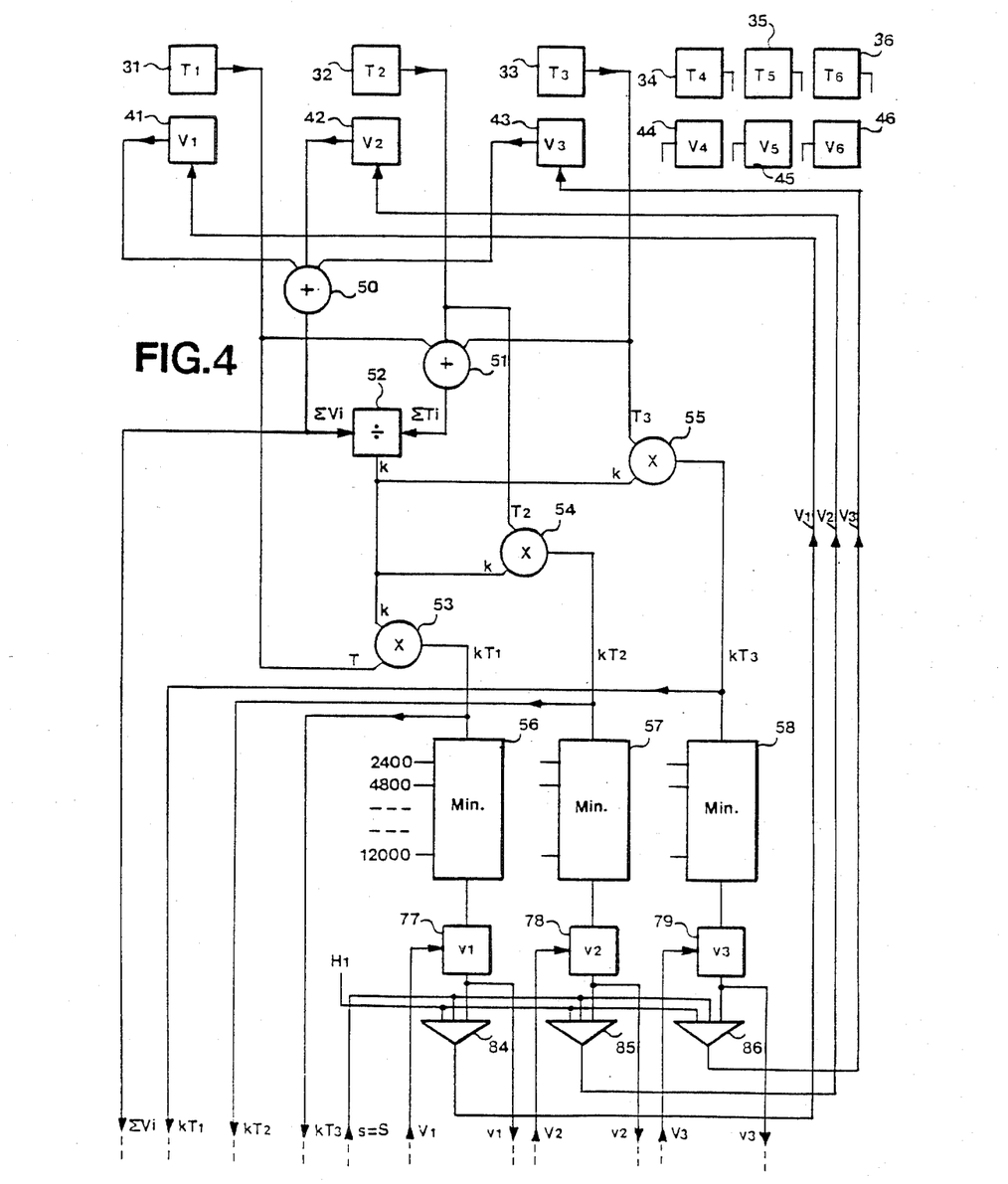
FIGS. 4 and 5 illustrate, in a schematic form, a logic circuit for determining the optimum operating rate distribution for each interface.
Figure 5:
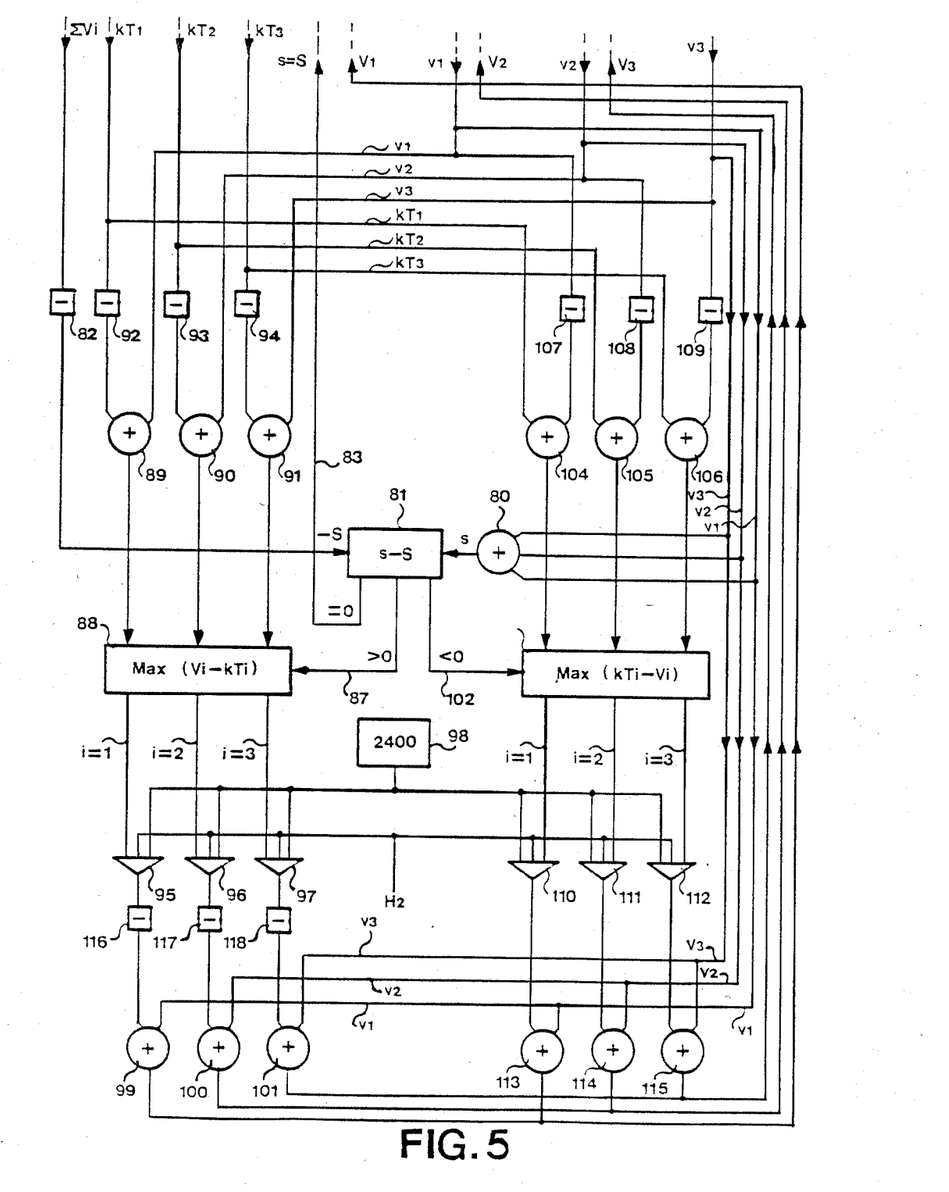

FIGS. 4 and 5 are exemplary schematic diagrams of the logic circuits for implementing the rate allocation procedure which has just been described.

These circuits are comprised of six registers 31, 32, ..., 36 for respectively (and possibly) storing values $T^n{}_i$, $T^n{}_2$, .... $T^n{}_6$ of the traffics valuated at time $t_n$ on the six interfaces according to this invention, and six registers 41, 42, ... 46 for, respectively (and possibly) storing rates $V_1$, $V_2$, ... $V_6$ allocated to the six interfaces at time $t_n$. In this example, it will be supposed, in order to make the schematic diagram and the explanation thereof, clearer, that there are only three active free rate interfaces and that the data relative to these three interfaces are stored in registers 31, 32, 33 and 41, 42, 43. Still for the purpose of a better understanding, the circuits connected to the remaining registers, have not been shown, since they are quite identical with those shown for the first three registers.

Therefore, it is supposed that, at a given time, registers 31, 32 and 33 are containing the values of the valuated traffics $T_1$, $T_2$ and $T_3$ for interfaces IA1, IA2, and IA3, respectively, and that registers 41, 42 and 43 are containing the rates $V_1$, $V_2$ and $V_3$ for these same interfaces, respectively.

Adder 50 is used to carry out sum $V_i = V_1 + V_2 + V_3$ which will be referred to as S, for a better understanding, and adder 51 is used to carry out sum $T_i = T_1 + T_2 + T_3$. These sums are applied to divider 52 which calculates $k = \Sigma V_i / \Sigma T_i = S/\Sigma T_i$.

Multipliers 53, 54 and 55 carry out products $kT_1$, $kT_2$ and $kT_3$, respectively, which are applied to one of the inputs of three minimum value computers 56, 57 and 58, respectively.

Figure 6:
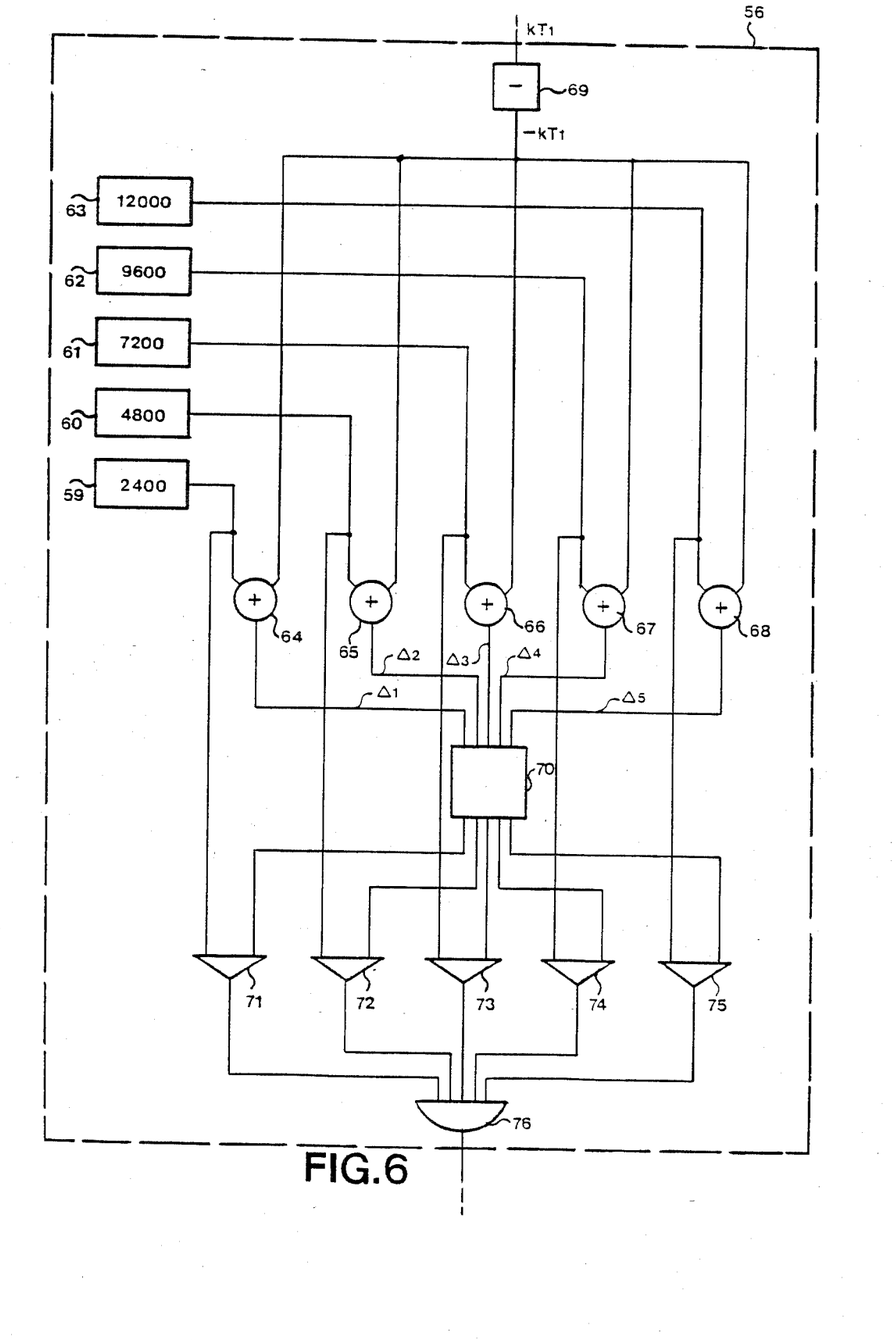
FIG. 6 illustrates, in more details, circuit 56 schematically shown in FIG. 4.

Both function and structure of each of these circuits (which are substantially identical) will be explained in reference to FIG. 6 which shows an exemplary circuit of these circuits, such as, for instance, circuit 56.

The function of circuit 56 is, first, to calculate entities $|kT_i - 2400\, p_i|$ for each of the values of $p_i$, and then, to find out value $p_i$, therefore, value of $v_i$, for which this entity is minimum, according to step 1 of the above described procedure.

The circuit is comprised of five registers 59, 60, 61, 62, 63 containing the five free rates 2400, 4800, 7200, 9600 and 12000, respectively. The outputs of these registers are connected to the first inputs of five adders 64, 65, 66, 67 and 68, respectively, the second inputs of which receive product $-kT_1$ obtained by inverting the input signal of circuit 56, in sign inverter 69. The results $\Delta_1$, $\Delta_2$, $\Delta_3$, $\Delta_4$ and $\Delta_5$ of the five operations $|kT_i - 2400\, p_i|$ are sent into a comparison/decision circuit 70 which determines which of values $\Delta 1$, $\Delta 2$, $\Delta 3$, $\Delta 4$ and $\Delta 5$, is the lowest. Such a circuit is comprised of five outputs and it sends a set signal on to that output out of the five thereof which corresponds to the lowest value. These five outputs are connected to the first inputs of five AND gates 71, 72, 73, 74 and 75 the second inputs of which are connected to the outputs of registers 59 through 63, respectively and, therefore, receive the five rates 2400 through 12000. The outputs of gates 71 through 75 are the inputs of an OR gate 76 the output of which will transmit that rate out of the five rates 2400 through 12000 which corresponds to the lowest value, namely, $v_1$.

The same holds true for circuits 57 and 58 which will respectively produce at their outputs, values $v_2$ and $v_3$ corresponding to the minimum values calculated in each of them.

Values $v_1$, $v_2$ and $v_3$ are introduced into three registers 77, 78 and 79, respectively.

The outputs of these three registers are connected to adder 80 (FIG. 5) the output of which produces sum $s = v_1 + v_2 + v_3$. This output is connected to a first input of adder 81 the second input of which receives signal $-S = -(V_1 + V_2 + V_3)$ from adder 50, once sign has been inverted in inverter 82. Circuit 81, therefore, carries out operation $s - S$ and produces a set signal onto one of its three outputs, according as $s - S = 0$, $s - S > 0$, or $s - S < 0$ (step 3 in the procedure).

The first output line 83 of circuit 81 (the one which is activated for $s - S = 0$) is connected to each of the first inputs of three AND gates 84, 85 and 86. The second inputs of these AND gates are connected to the three outputs of registers 77, 78 and 79, respectively. As to the outputs of AND gates 84, 85 and 86, they are connected to the inputs of registers 41, 42 and 43, respectively.

It can be observed that, when $s - S = 0$, the contents of registers 77, 78 and 79 are transferred into registers 41, 42 and 43 which define the rates of the three interfaces IA1, IA2 and IA3, according to step 4A of the procedure.

When circuit 81 determines that $s - S$ is higher than zero, the second output line 87 of circuit 81 is activated. This line applies a set signal to circuit 88 the function of which is to determine which is the interface out of the three ones for which entity $(2400\, p_i - kT_i)$ or $(v_i - kT_i)$ is maximum (step 4b in the procedure).

Circuit 88 is comprised of three inputs receiving values $v_1 - kT_1$, $v_2 - kT_2$ and $v_3 - kT_3$, respectively. These values are provided by the outputs of three adders 89, 90 and 91, respectively. The first inputs of these three adders are connected to the output lines of registers 77, 78 and 79 (which produce values $v_1$, $v_2$ and $v_3$, respectively). The second inputs of these adders are respectively connected, through three sign inverters 92, 93 and 94, to the output lines of adders 53, 54 and 55 (which produce products $kT_1$, $kT_2$ and $kT_3$). Circuit 88, which is comprised of three outputs, compares the three values $v_i - kT_i$ which are applied thereto, determines which values is maximum, and produces a set signal on that output thereof which corresponds to the interface the value of which $v_i - kT_i$, is maximum. In order to make the understanding clearer, it will be supposed that such output is output 1.

The outputs of circuit 88 are respectively connected to the first inputs of three AND gates 95, 96 and 97 each of the second inputs of which receives value 2400 from a fixed contents register 98. The outputs of these AND gates are connected to the first inputs of three adders 99, 100, and 101 respectively through three sign inverters 116, 117 and 118. Thus, value $-2400$ is applied to only one (99) of these adders since only one (95) of these AND gates 95, 96 and 97 is enabled. The second inputs of adders 99, 100 and 101 receive values $v_1$, $v_2$ and $v_3$ produced by registers 77, 78 and 79, respectively. Adder 99 will produce value $v_1 - 2400$ on its output, which is, then, transferred into register 77 wherein it will replace the preceding value, namely, $v_1$. The contents of the other two registers do not change since the other two adders 101 and 102 having an inactive input (the outputs of AND gates 96 and 97) produce no output signal.

Registers 77, 78 and 79, then, contain a new series of rates $v_1 - 2400$, $v_2$ and $v_3$ the sum of which $s' = s - 2400$ is made again in adder 80. Then, circuit 81 determines again if $s'$ is equal to, higher or lower than S and so on, until equality of the two sums, in which case the values of the rates contained in registers 77, 78 and 79 are transferred into registers 41, 42 and 43, as seen above under step 4a, and are the rates allocated to interfaces IA1, IA2, and IA3, respectively.

When, after the comparison made by circuit 81 at step 3 of the procedure, the circuit determines that s−S is lower than zero, the third output line 102 of circuit 81, is activated. This line, then, produces a set signal on to circuit 103 the function of which is to determine which interface out of the three is the one for which entity $(kT_i-2400p_i)$ or $(kT_i-v_i)$ is maximum (step 4c in the procedure). Circuit 103 is comprised of three inputs receiving values $kT_1-v_1$, $kT_2-v_2$ and $kT_3-v_3$, respectively. These values are produced by the outputs of three adders 104, 105 and 106, respectively. The first inputs of these three adders are respectively connected through three sign inverters 107, 108 and 109 to the output lines of registers 77, 78 and 79 (which produce values $v_1$, $v_2$ and $v_3$). The second inputs of these adders are respectively connected to the output lines of adders 53, 54 and 55 which produce products $kT_1$, $kT_2$ and $kT_3$).

Circuit 103, which is comprised of three outputs, compares the three values $kT_i-v_i$ which are applied thereto, determines which one is maximum, and produces a set signal on that output thereof which corresponds to the interface the value of which $kT_i-v_i$, is maximum. In order to make the understanding clearer, it will be supposed that such output is output 2.

The outputs of circuit 103 are respectively connected to the first inputs of three AND gates 110, 111 and 112 the second inputs of which receive value 2400 from the fixed contents register 98. The outputs of these AND gates are connected to the first inputs of three adders 113, 114 and 115. Thus, value 2400 is applied to only one (114) of these adders since only one (111) of AND gates 110, 111 and 112, is enabled. The second inputs of adders 113, 114 and 115 receive values $v_1$, $v_2$ and $v_3$ which are produced by registers 77, 78 and 79, respectively. Adder 114 will produce value $v_2+2400$ on its output, which is, then, transferred into register 78 wherein it will replace the preceding value, namely, $v_2$. The contents of the other two registers do not change since the other two adders 113 and 115 having an inactive input (the outputs of AND gates 110 and 112) produce no output signal.

Registers 77, 78 and 79 then, contain a new set of rates $v_1$, $v_2+2400$ and $v_3$ the sum of which $s''=s+2400$ is carried out again by adder 80. Then, circuit 81 determines again if $s''$ is equal to, higher or lower than S, and so on, until equality of the two sums, in which case the values of the rates obtained in registers 77, 78 and 79 are transferred into registers 41, 42 and 43, as seen above.

Figure 7:
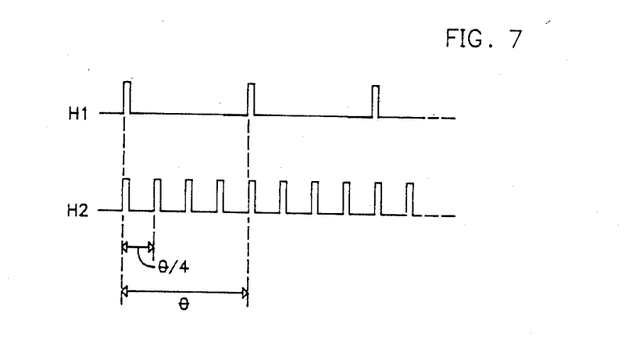
FIG. 7 illustrates, in a schematical form, the chronological pulses produced by circuits $H_1$ and $H_2$ of FIGS. 4 and 5.

The logic circuits illustrated in FIGS. 4 and 5 are also comprised of timing signal providing circuits for controlling the appropriate progression of the different steps in the procedure. In practice, two timing circuits are enough. The first one, $H_1$ (FIG. 4) is connected to a third input of AND gates 84, 85 and 86. It controls the transfer of the rate values calculated by the logic and definitively allocated (for the considered time period) to the three interfaces, into registers 41, 42 and 43. The time length for the pulses produced by circuit $H_1$ is equal to the sampling time length, namely $\theta$ (it should be reminded that $\theta=t_n-t_{n-1}$). The second timing circuit $H_2$ (FIG. 5) is connected to a third input of AND gates 95, 96, 97, 116, 117 and 118. It controls the transfer of values $v_i+2400$ or $v_i-2400$ calculated under steps 4b or 4c of the procedure, into registers 77, 78 or 79. Since steps 4b or 4c can be repeated several times during one procedure, the time length of the pulses produced by circuit $H_2$ will be a sub-multiple of $\theta$ for instance $\theta/4$ (in this example, steps 4b or 4c cannot be repeated more than four times). FIG. 7 shows, in a schematic form, the pulses produced by circuits $H_1$ and $H_2$.

In the practice, the dynamical rate allocation procedure according to this invention, is used as soon as the system starts operating, but it is obvious that it is necessary to provide for a predetermined initial rate distribution, beforehand. Such an initial distribution will, more specifically, depend on:

the common multiplex channel rate
the available rate range
the existence of secondary fixed rate networks
the number of the terminal interfaces or lines connected to the system.

The following table illustrates an exemplary initial rate distribution which can be applied to a six-interface 14400 BPS communication system with a 2400 BPS minimum rate and a 2400 BPS multiple rate distribution.

| Sum of the free rates (non-allocated to secondary networks) | Nb of free rate interface | | | | | |
|---|---|---|---|---|---|---|
| | 6 | 5 | 4 | 3 | 2 | 1 |
| 14 400 | 2400 | 4800 | 4800 | 4800 | 7200 | 14400 |
| | 2400 | 2400 | 4800 | 4800 | 7200 | |
| | 2400 | 2400 | 2400 | 4800 | | |
| | 2400 | 2400 | 2400 | | | |
| | 2400 | 2400 | | | | |
| | 2400 | | | | | |
| 12 000 | | 2400 | 4800 | 4800 | 7200 | 12000 |
| | | 2400 | 2400 | 4800 | 4800 | |
| | | 2400 | 2400 | 2400 | | |
| | | 2400 | 2400 | | | |
| | | 2400 | | | | |
| 9 600 | | | 2400 | 4800 | 4800 | 9600 |
| | | | 2400 | 2400 | 4800 | |
| | | | 2400 | 2400 | | |
| | | | 2400 | | | |
| 7 200 | | | | 2400 | 4800 | 7200 |
| | | | | 2400 | 2400 | |
| | | | | 2400 | | |
| 4 800 | | | | | 2400 | 4800 |
| | | | | | 2400 | |
| 2 400 | | | | | | 2400 |

It should be noted that, in this table, the purpose was to maintain, for each case, a minimum discrepancy between both maximum and minimum rates in order to start with an average rate distribution. By way of an example, in the case of a 14400 BPS available rate sum, with two active free rate lines, the operation will start with a 7200 BPS identical rate for each line. If, after starting the system, the tests carried out according to the formula of this invention, shows that one of the lines has a traffic approaching zero, for instance, the system will automatically be switched on to a 12000 BPS / 2400 BPS distribution. On the other hand, when the tests carried out from the above-mentioned formula shows a slight traffic discrepancy between the two lines, the system will automatically select two identical rates (7200 and 7200) or two rates which are as close to each other as possible (9600 and 4800 BPS). In all cases, the rate sum will correspond to the free rate sum in the system, thereby maintaining an optimal throughput, in a permanent way.

It has been mentioned at the beginning of this disclosure that, once the communication rates have been allocated to the various interfaces for a given communication direction, such as, for instance, from station A to station B, the receivers at station B should be informed of the rates allocated to the various interfaces so that said receivers can get synchronized in an appropriate manner. Such information can be transferred in the form of a 18-bit string (when still keeping the above-mentioned example) wherein each three-bit group is representative of the status and/or communication rate corresponding to each interface, when applying the following exemplary code.

| 000 | inactive interface | |
|-----|--------------------|----------|
| 001 | active interface   | 2400 BPS |
| 010 | active interface   | 4800 BPS |
| 011 | active interface   | 7200 BPS |
| 100 | active interface   | 9600 BPS |
| 101 | active interface   | 12000 BPS |
| 110 | active interface   | 14400 BPS |
| 111 | non allocated      | |

This information, which is very short, can be transferred for each interface during a time length when the interface is inactive.

Figure 8:
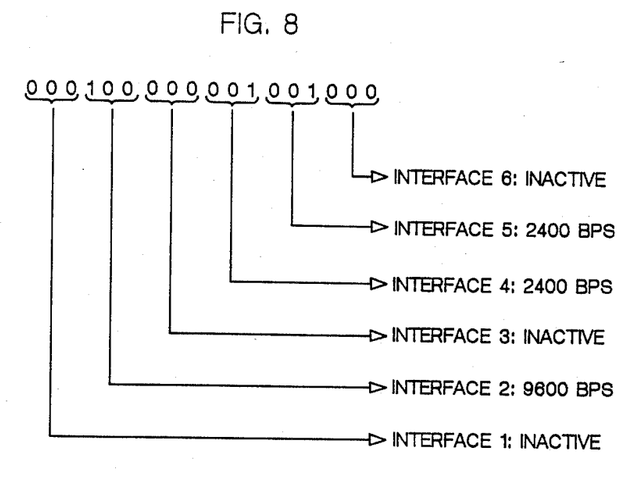
FIG. 8 is an exemplary 18-bit string representative of a particular distribution of the operating rates allocated according to this invention.
Figure 9:
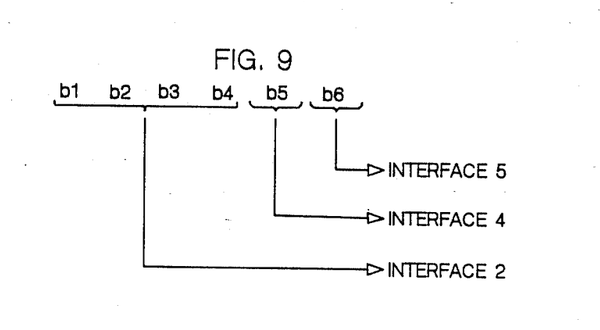
FIG. 9 illustrates, in a schematic form, the distribution of the binary information conveyed at any given signalling time in the exemplary operating rate distribution of FIG. 8.

FIG. 8 shows, by way of an example, such a bit string when only interfaces 2, 4 and 5 are active. With such a string, it is possible to define simply the allocation of six binary elements which will be transferred onto multiplex channel C, over each signalling time, as long as the rate distribution remains the same as the one shown in FIG. 8. These six binary elements b1 through b6 are schematically shown in FIG. 9 which shows that the first four binary elements b1 through b4 are allocated to interface 2 (having a 4×2400 BPS rate) and the remaining binary elements b5 and b6 are allocated to the 2400 BPS rate interfaces 4 and 5, respectively.

I claim:

1. A method for dynamically allocating the capacity of a communication system having a plurality of lines each of which can operate at any one of a number of information signaling rates selected from a set of information signaling rates (V1, V2, ..., Vj) and in which the information signals on the plurality of lines are multiplexed onto a common channel having a maximum signaling rate Vc, said method including the following steps:

(a) measuring the number of significant information signals $b_i^n$ passing through each of the lines during a time interval $\phi$ extending between times $t_{n-1}$ and $t_n$;

(b) calculating for each line, an activity factor $F_i^n$ at time tn according to the expression $$F_i^n = b_i^n[\alpha + (1-\alpha) \cdot Vm/Vi]$$

in which
α is a coefficient between 0 and 1,
Vm equals the rate of the fastest line, and
Vi equals the rate of the line under consideration; and (c) allocating the maximum information signaling rate Vc amongst all of the lines so that the deviation between the calculated activity factor for the lines and the allocated signaling information rate for the lines is minimized.

2. A method for dynamically allocating the capacity of a communication system having a plurality of lines each of which can operate at any one of a number of information signaling rates selected from a set of information signaling rates (V1, V2, ... Vj) and in which the information signals on the plurality of lines are multiplexed onto a common channel having a maximum signaling rate Vc, the sum (S) of selected information rates for the lines being equal to or less than the signaling rate Vc, said method including the following steps:

(a) measuring the number of significant information signals $b_i^n$ passing through each of the lines during a time interval $\phi$ extending between times $t_{n-1}$ and $t_n$;

(b) calculating for each line an activity factor $F_i^n$ at time $t_n$ according to the expression $$F_i^n = b_i^n[\alpha + (1-\alpha) \cdot Vm/Vi]$$

in which
α is a coefficient between 0 and 1 Vm equals the signaling rate of the fastest line, and
Vi equal the signaling rate of the line under consideration; and, (c) calculating a value $T_i^n$ of the traffic at time $t_n$, according to the expression $$T_i^n = \beta F_i^n + (1-\beta) T_i^{n-1}$$

in which
β is coefficient between 0 and 1
$T_i^{n-1}$ is the value of the traffic at time $t_{n-1}$;

(d) allocating up to the maximum information signaling rate $V_c$ amongst the lines in an amount selected from the values V1, V2, ... Vj and in accordance with the value $T_i^n$ calculated for each line and minimizing the deviation between the calculated value $T_i^n$ for the lines and the signaling information rate allocated for the lines.

3. A method according to claim 2, characterized in that step (d) includes the following steps:
calculating a factor $k = S/\Sigma T_i^n$; and, determining those rates Vi of the series V1, V2, ... Vj, for which the respective values $V_i - kT_i^n$ for each of the lines are a minimum and in which the sum $\Sigma Vi$ of the so determined rates equals S.

4. A method according to any one of claims 1, 2 or 3 in which the significant information signals represent binary "0" bits.

5. A method according to claim 2 for use in a communication network in which the set of information signaling rates takes the form PVo where P = 1, 2 ..., j, and Vo is the lowest information signaling rate, characterized in that step (d) includes the following steps:

(d1) calculating a factor $k = S/\Sigma T_i^n$ (d2) determining those rates $v_i = p_i V_o$ relative to the different lines for which the entities $v_i - kT_i^n$ are minimum, (d3) making sum $s = \Sigma v_i$, (d4) calculating the difference s − S and:
when s − S = > 0 allocating the so-determined rates $v_i$ to the corresponding lines
when s − S < 0, finding out that rate from amongst rates $v_i$ determined under sub-step (d2) for which entity $(V_i - kT_i^n)$ is maximum taking value $v'_i = v_i - V_o$ as the new rate value for the corresponding line, resuming sub-steps (d3) and (d4) and so on, until finding s − S = 0.
when s − S 0, finding out that rate from amongst rates $v_i$ determined during sub-step (d2) for which entity $(kT(_i^n - v_i))$ is maximum taking the value $v'' = v_i + V_o$ as the new rate value for the corresponding line, resuming sub-steps (d3) and (d4) and so on, until finding s − S = 0.

* * * * *